(12) United States Patent
Hong et al.

(10) Patent No.: US 7,329,539 B2
(45) Date of Patent: Feb. 12, 2008

(54) BIOREACTOR FOR SEWAGE AND WASTEWATER TREATMENT

(75) Inventors: Wan-Pyo Hong, Hwaseong-kun (KR); Jin-Man Kim, Suwon (JP); Ki-Seung Choi, Uiwang (KR); Hi-Weon Jung, Suwon (KR); Soon-Jong Hahn, Seoul (KR); Jong-Taek Kim, Suwon (KR)

(73) Assignee: SK Chemicals Co., Ltd., Suwon (KR)

( * ) Notice: Subject to any disclaimer, the term of this patent is extended or adjusted under 35 U.S.C. 154(b) by 433 days.

(21) Appl. No.: 10/343,673

(22) PCT Filed: Jun. 3, 2002

(86) PCT No.: PCT/KR02/01055

§ 371 (c)(1),
(2), (4) Date: Feb. 3, 2003

(87) PCT Pub. No.: WO02/098800

PCT Pub. Date: Dec. 12, 2002

(65) Prior Publication Data

US 2003/0175948 A1    Sep. 18, 2003

(30) Foreign Application Priority Data

Jun. 4, 2001    (KR) .............................. 2001-31192

(51) Int. Cl.
*C12M 1/00*    (2006.01)
*C12M 3/00*    (2006.01)
*C12M 1/02*    (2006.01)
*C12M 1/09*    (2006.01)
*C12M 1/12*    (2006.01)

(52) U.S. Cl. .................. 435/295.2; 435/296.1; 435/295.1; 435/297.1; 435/297.2; 435/297.3; 435/297.4; 435/304.1

(58) Field of Classification Search ............. 435/296.1, 435/295.2, 295.1, 297.1, 297.2, 297.3, 297.4, 435/304.1
See application file for complete search history.

(56) References Cited

U.S. PATENT DOCUMENTS 3,926,738 A * 12/1975 Nyiri et al. .............. 435/286.5

(Continued)

FOREIGN PATENT DOCUMENTS

JP    08-182995    7/1996

(Continued)

*Primary Examiner*—Gladys J P Corcoran
*Assistant Examiner*—Nathan A. Bowers
(74) *Attorney, Agent, or Firm*—Baker Botts L.L.P.

(57) ABSTRACT

The present invention relates to a bioreactor for sewage and wastewater treatment, which is capable of agitating and supplying oxygen simultaneously. A bioreactor of the present invention, comprises a culture drum in which microorganisms are cultured; a supplier for supplying a culture solution, and organic and inorganic media to the culture drum, the supplier including a supply tube connected to an upper side of the culture drum, and a pump connected to the supply tube for supplying the culture solution to the culture drum; an agitator for agitating the culture solution by spraying air into the culture solution in the culture drum, the air being supplied from an air blower; and a thermostatic controller for controlling a temperature of the culture solution and disinfecting the interior of the culture drum.

5 Claims, 3 Drawing Sheets

U.S. PATENT DOCUMENTS

| | | | |
|---|---|---|---|
| 4,593,611 A * | 6/1986 | Bruch | 99/277.1 |
| 4,649,117 A * | 3/1987 | Familletti | 435/296.1 |
| 5,827,701 A * | 10/1998 | Lueking et al. | 435/168 |
| 5,985,649 A | 11/1999 | Stensel et al. | |
| 6,087,155 A | 7/2000 | York et al. | |
| 6,299,837 B1 * | 10/2001 | Paul et al. | 422/26 |
| 6,395,521 B1 * | 5/2002 | Miura | 435/168 |

FOREIGN PATENT DOCUMENTS

| | | |
|---|---|---|
| JP | 2000-083648 | 3/2000 |
| KR | 100121769 B1 | 8/1997 |

\* cited by examiner

BIOREACTOR FOR SEWAGE AND WASTEWATER TREATMENT

BACKGROUND OF THE INVENTION (a) Field of the invention

The present invention relates to a reactor for culturing microorganism used for treating sewage and wastewater, and more particularly to a bioreactor for sewage and wastewater treatment, in which the bioreactor is capable of agitating and supplying oxygen simultaneously.

(b) Description of the Related Art

Generally, methods of treating wastewater include a physical-chemical method and a biological method. The drawbacks of the physical-chemical method include high costs and the need to re-treat the products, while the biological method produces a relatively little amount of product after treatment by resolving a large amount of organism elements into carbon dioxide to be stabilized, or by removing organic matters contained in wastewater with the generation of methane gas.

In the biological treatment method, pollutants in wastewater can be resolved, detoxified, and separated by using mainly microorganisms. Hence, the method is applied to treat industrial sewage containing organic matter and sludge generated therefrom, and to secondarily treat life sewage. Due to the relatively low cost and the variations of work progress, the biological method has been most widely used all over the world.

Microorganisms that play a core role in biological treatment are mixed cultures including various microorganism populations such as bacteria, fungi, protozoa, and metazoa, which are cultured and multiplied in a bioreactor. Such microorganisms cleanse sewage and wastewater by resolving and removing organic pollutants, which nourish the microorganisms, while the microorganisms multiply using oxygen dissolved in wastewater.

The bioreactor is a device that provides conditions similar to those found in nature to allow facultative microorganisms to be efficiently cultured. The bioreactor supplies a culture solution, organic and inorganic media, and air to the inside of the bioreactor, and cultures and multiplies the microorganisms.

Since the bioreactor is directly related to the culture and multiplication of microorganisms, the efficiency of sewage and wastewater treatment or the activation state of microorganisms depends on the bioreactor.

As a prior art method to enhance the efficiency of sewage and wastewater treatment by employing a bioreactor, published PCT Application WO 96/15992 discloses a method of treating sewage by injecting four types of aerobic and anaerobic microorganisms into an aeration tank without exhausting unpleasant odors, noxious gases, and toxic substances.

However, the above-described method is not used to multiply microorganisms in the aeration tank, and instead is used for removing noxious gases, etc. by applying specific microorganisms obtained from nature to the sewage sludge. A drawback of the method is that it takes long time for the injected microorganisms to treat the sludge.

U.S. Pat. No. 5,376,275 discloses an activated sludge treatment process, wherein a sewage sludge component is fermented for a period of at least 15 days to form soluble carbonaceous substrates, the fermented sludge component is contacted with influent sewage to form a conditioned sewage, and the conditioned sewage is supplied to the activated sludge plant.

However, the above-described process is not used for multiplying microorganisms in the fermentation plant, and instead is used for the dephosporization and denitrification of the sludge by using microorganisms. This method also has the drawback that it takes long time, for example, from 15 days to 60 days, to treat the sludge.

SUMMARY OF THE INVENTION

It is an object of the present invention to provide a bioreactor for sewage and wastewater treatment which is capable of agitating and supplying oxygen simultaneously.

It is still yet another object of the present invention to provide a bioreactor for sewage and wastewater treatment which is capable of accomplishing disinfection and culture through a swift change of temperature.

It is still yet another object of the present invention to provide a bioreactor for sewage and wastewater treatment which is capable of minimizing heat efflux.

It is still yet another object of the present invention to provide a bioreactor for sewage and wastewater treatment which is capable of bringing an aeration solution of an external wastewater disposal plant into the bioreactor to ease the culture of microorganisms.

It is still yet another object of the present invention to provide a bioreactor for sewage and wastewater treatment which is capable of easily activating the microorganisms.

In order to achieve the objects, a bioreactor according to a preferred embodiment of the present invention includes a culture drum in which microorganisms are cultured; a supplier for supplying a culture solution, and organic and inorganic media to the culture drum; and an agitator for agitating the culture solution while injecting air into the culture drum.

The present invention further includes a thermostatic controller provided in the culture drum, the thermostatic controller being for controlling a temperature of the culture solution.

The supplier includes a supply tube connected to an upper side of the culture drum, and a pump for supplying the culture solution to the culture drum, the pump being connected to the supply tube. The supplier may also include a valve for opening and shutting the supply tube, and a pressure gauge.

The agitator includes an air blower for air supply, an injection pipe provided in the culture drum for injecting the air supplied from the air blower to the culture drum, and an injection nozzle arranged on the injection pipe in a predetermined direction for circulating the culture solution in the culture drum.

The thermostatic controller includes a low temperature heater and a high temperature heater provided in the culture drum, and a heater controller.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

In the following detailed description, only the preferred embodiment of the invention has been shown and described, simply by way of illustration of the best mode contemplated by the inventors of carrying out the invention.

Figure 1:
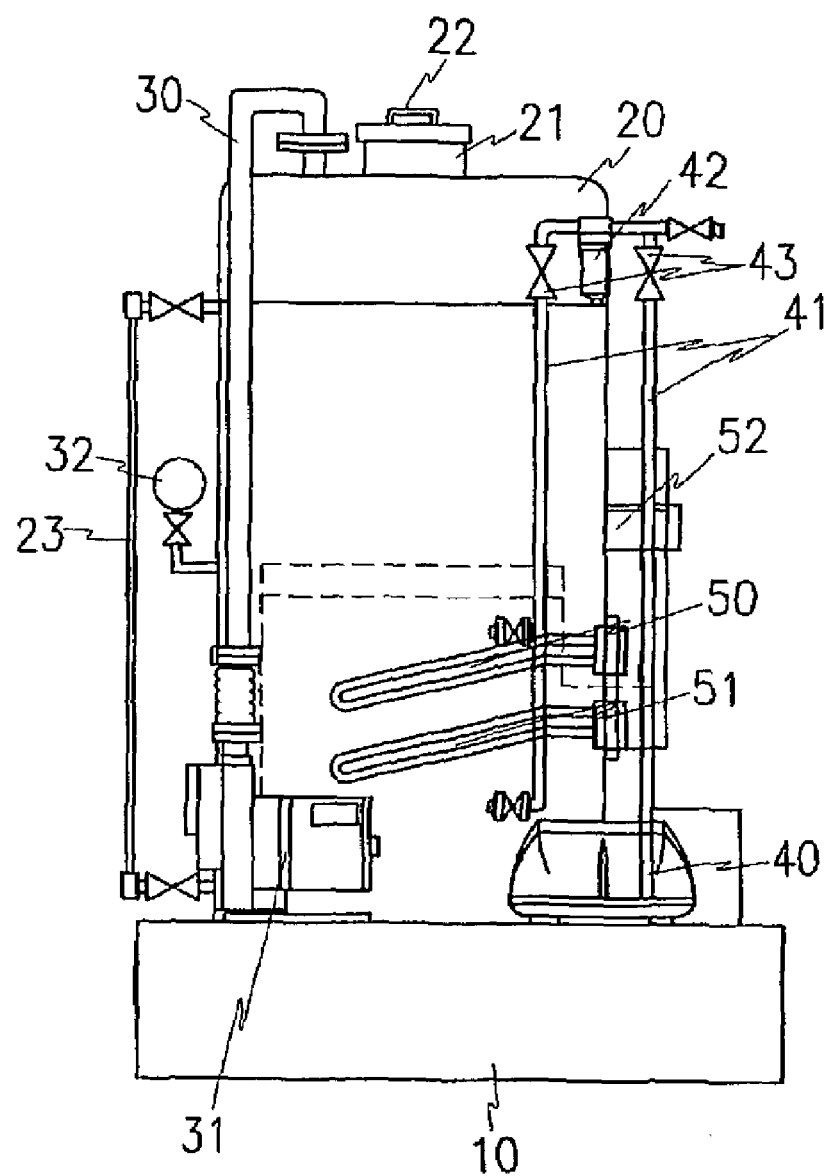
FIG. 1 is a schematic view of a bioreactor according to a preferred embodiment of the present invention.
Figure 2:
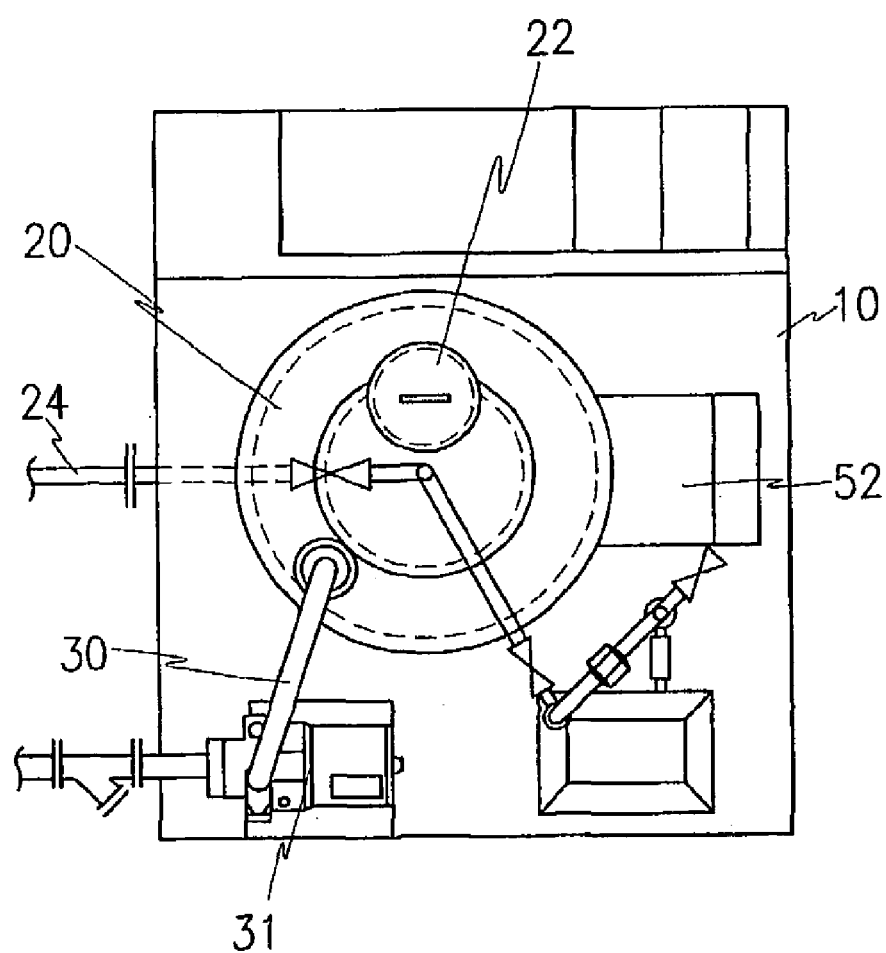
FIG. 2 is a plan view of the bioreactor of FIG. 1.
Figure 3:
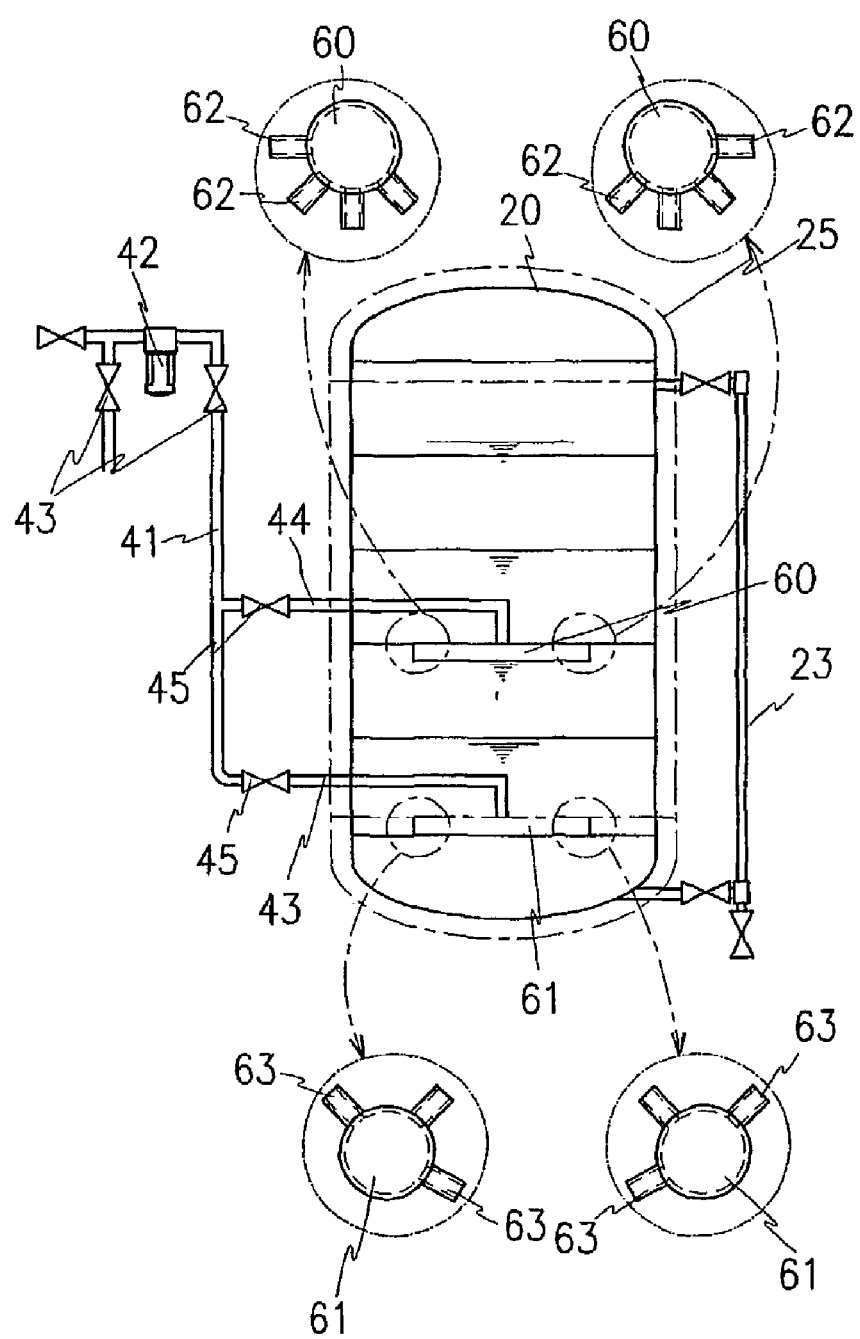
FIG. 3 is a schematic sectional view of the bioreactor of FIG. 1.

FIG. 1 is a schematic view of a bioreactor according to a preferred embodiment of the present invention, FIG. 2 is a plan view of the bioreactor, and FIG. 3 is a schematic sectional view of the bioreactor.

Referring to FIGS. 1 through 3, a bioreactor according to a preferred embodiment of the present invention comprises a culture drum 20 vertically provided on a base frame 10 in the shape of a cylinder, a supply tube 30 connected to an upper side of the culture drum for injecting a culture solution into the culture drum 20, a pump 31 provided on the base frame 10 and connected to the supply tube 30 for transferring the culture solution through the supply tube 30, an air blower 40 provided on the base frame 10 for air supply, an air supply hose 41 connected to the air blower 40 for transfer of air therethrough, injection pipes 60 and 61 connected to the air supply hose 41 at a vertically predetermined interval inside the culture drum 20, the injection pipe 60 having a ring shape, injection nozzles 62 and 63 arranged along outer circumferences of the injection pipes 60 and 61 at an angle of a predetermined angle for agitating the culture solution, a low temperature heater 50 provided inside the culture drum 20 for heating the culture solution, a high temperature heater 51 provided inside the culture drum 20 for disinfecting the inside of the culture drum 20 at a high temperature after discharging the culture solution, and a heater controller 52.

To the overall outer surface of the culture drum 20 is attached a heat shield material 25 such as polyurethane. The culture drum 20 is provided with an inlet 21 on the upper side thereof for supplying culture media etc., and the inlet 21 is provided with a cover 22 for closing the inlet 21.

A level gauge 23 provided to the outer side of the culture drum 20. The level gauge 23 is a transparent tube that is vertically arranged to allow the water level in the culture drum 20 to be visually verified. A thermometer (not shown) is provided to a side of the culture drum 20 for observing the temperature of the culture solution, and a discharge tube 24 is provided to the bottom of the culture drum 20 for discharging the culture solution that has been cultured.

The pump 31 is fixedly provided on the base frame 10, and is connected to an aeration tank of a wastewater treatment plant, which is located outside the culture drum 20, through the supply tube 30. The pump 31 draws an aeration solution, etc. from the wastewater treatment plant, and injects the aeration solution, etc. into the culture drum 20 through the supply tube 30 connected to the upper side of the culture drum 20. In addition, a pressure gauge 32 is provided to a side of the supply tube 30.

The air blower 40 is fixedly provided to a side of the base frame 10. The air supply hose 41 connected to the air blower 40 includes an air filter 42 on an end thereof. The air filter 42 filters out impurities contained in the air then supplies the fresh air, which is required as a condition for culturing, to the culture solution. A solenoid valve 43 is provided to the air supply hose 41, the solenoid valve 43 being located before and behind the air filter 42.

The air supply hose 41 is vertically mounted along the sidewall of the culture drum 20, and branch lines 43 and 44 are extended from the lower end and the part above the lower end of the air supply hose 41, respectively, to the inside of the culture drum 20 through the sidewall of the culture drum 20. The injection pipes 60 and 61, which has ring shape, are provided at the end of each of the branch lines 43 and 44.

The injection pipes 60 and 61 are located at the center of the culture drum 20 at a predetermined distance from the inner wall of the culture drum 20, and supported by connecting an end thereof with the end of the branch lines 43 and 44. Alternatively, the injection pipes 60 and 61 may be supported by providing a connecting tube that crosses the center of the injection pipes 60 and 61, and by connecting the connecting tube to the branch lines 60 and 61 that are introduced into the culture drum 20 and bent downward at the center of the culture drum 20. In this case, the air would be transferred to the injection pipes 60 and 61 via the air supply hose 41 and the branch lines 43 and 44 through the connecting tube.

A solenoid valve 45 is provided on each of the branch lines 43 and 44 that are extended from the air supply hose 41. The solenoid valves 45 open and close each of the branch lines 43 and 44.

The low temperature heater 50 is used to ensure an optimum temperature of the culture solution, a change in the physical properties of the culture solution, and the effective conditions of the culture solution. The surface temperature of the low temperature heater 50 is raised to less than about 60° C. The high temperature heater 51 is used for disinfection. The surface temperature of the high temperature heater 51 is raised to more than about 60° C.

The above two heaters 50 and 51 are provided in the culture drum 20 at a predetermined interval, and are supplied with electric power by the heater controller 52 provided on the outer surface of the culture drum 20.

The heater controller 52 supplies electric power to a hot wire of the low temperature heater 50 so as to satisfy the effective culture conditions of the culture solution, and can maintain the temperature of the culture solution at an optimum level.

The injection nozzles 62 and 63 provided on the injection pipes 60 and 61, respectively; mix the culture solution by supplying air to the culture solution and controlling the direction of the injected air. As shown in FIG. 3, a plurality of injection nozzles 62 is located at the outer surface of the upper injection pipe 60. The injection nozzles 62 extend from the outward direction to the downward direction along the outer circumference of the ring-shaped injection pipe 60. Also, a plurality of injection nozzles 63 is located at the outer surface of the lower injection pipe 61. The injection nozzles 63 extend from the inward direction to the upward direction along the outer circumference of the ring-shaped injection pipe 61.

Since each of the injection nozzles 62 and 63 provided to the upper and lower injection pipes 60 and 61 are formed at a predetermined angle with each other, the culture solution is raised at the interior of the injection pipes 60 and 61 and lowered at the exterior of the injection pipes 60 and 61, and thus is circulated by the air injected from the injection nozzles 62 and 63. During the above process, the culture solution can be mixed sufficiently.

An operation of the present invention will now be described.

A solution including microorganisms intended for culturing is transferred to the culture drum 20 through the supply tube 30 by the pump 31. The quantity of the supplied culture solution can be determined by observing the level gauge 23 provided to the sidewall of the culture drum 20.

When the optimum quantity of the culture solution in the culture drum 20 has been reached, operation of the pump 31 is discontinued and the culture solution is heated to a predetermined temperature by supplying electric power to the low temperature heater 50.

Since the low temperature heater 50 is provided inside the culture drum 20, and thus is immersed in the culture solution, the heat generated from the heater 50 can be directly transferred to the culture solution so as to heat the culture solution to an optimum temperature.

The low temperature heater 50 can maintain the culture solution at a predetermined temperature (about 25±5° C.), while the surface temperature of the heater 50 is kept at a predetermined level (usually 30±10° C.) by the heater controller 52.

Culture media together with the culture solution are supplied into the culture drum 20 through the inlet 21 provided on the upper side of the culture drum 20 so as to activate culturing.

The culture solution is mixed with the culture media, and the mixture supplies the cultured microorganism with oxygen. The culture can be activated as a result.

The air blower 40 supplies air to each of the branch lines 43 and 44 through the air supply hose 41. The supplied air is transferred to the injection pipes 60 and 61 connected to the branch lines 43 and 44, respectively, and is finally sprayed to the culture solution through the injection nozzle 62 and 63 arranged along the outer circumference of the injection pipes 60 and 61, respectively.

The air through the injection nozzle 62 that is provided to the upper injection pipe 60 is sprayed in the directions ranging from the downward and outward directions of the ring-shaped injection pipe 60, so that the culture solution flows downward with the sprayed air.

On the other hand, the air through the injection nozzle 63 that is provided to the lower injection pipe 61 is sprayed in the directions ranging from the upward and inward directions of the ring-shaped injection pipe 61, so that the culture solution flows upward passing through the center of the injection pipe 61 with the sprayed air.

Therefore, the culture solution flows downward between the upper injection pipe 60 and the inner wall of the culture drum 20, then flows upward passing through the center of the lower injection pipe 61 by the injection nozzles 62 and 63, and thus the culture solution can circulate. During the above process, the culture solution and the culture media are mixed uniformly, and the supplied oxygen can be transferred uniformly to the microorganisms.

Accordingly, a bioreactor of the present invention is capable of agitating the culture solution and supplying oxygen thereto simultaneously by the injected air, without the use of an additional agitator.

After the culture has been completed, the culture solution is discharged through opening of the discharging tube 24 provided on the bottom of the culture drum 20, and the interior of the culture drum 20 is disinfected under high temperature conditions by operation of the high temperature heater 51. The interior of the culture drum 20 is rapidly heated and disinfected at a temperature used for this operation (about 95±5° C.) by operation of the high temperature heater 51.

The case where a bioreactor of the present invention is practically applied to wastewater treatment is described as follows.

Aeration solution of an aeration tank is directly introduced to the culture drum 20 through the supply tube 30, then microorganisms are mixed with the aeration solution under the same conditions as in the above.

Such microorganisms are supplied to wastewater through the injection nozzles 62 and 63 of the injection pipes 60 and 61. The microorganisms cleanse the sewage and wastewater by resolving and removing organic pollutants, which nourish the microorganisms, while the microorganisms are multiplied by using oxygen dissolved in wastewater.

The bioreactor according to the preferred embodiment of the present invention can easily culture the microorganisms by introducing the solution intended for culturing from the outside.

Further, the bioreactor according to the preferred embodiment of the present invention can increase the efficiency of wastewater treatment by directly culturing the aeration solution of the aeration tank.

The bioreactor according to the preferred embodiment of the present invention can also simplify structure by stirring the culture solution by the oxygen supplied into the culture drum without the use of an additional agitator.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A bioreactor comprising:
   a culture drum in which microorganisms are cultured;
   a supplier for supplying a culture solution, and organic and inorganic media to the culture drum, the supplier including a supply tube connected to an upper side of the culture drum, and a pump connected to the supply tube for supplying the culture solution to the culture drum;
   an agitator for agitating the culture solution by spraying air to the culture solution in the culture drum, the air being supplied from an air blower, wherein the sprayed air provides a controlled circulation pattern for the culture solution; and
   a thermostatic controller for controlling a temperature of the culture solution and disinfecting the interior of the culture drum, the thermostatic controller including at least a heater provided in the culture drum, and a heater controller;
   wherein the agitator includes an air supply hose which is vertically provided along the sidewall of the culture drum and connected to the air blower; two branch lines which are extended from the air supply hose to the inside of the culture drum through the sidewall of the culture drum; an upper and a lower ring-shaped injection pipe which are provided at the end of the branch lines; a first group of injection nozzles which are located at the outer surface of the upper injection pipe, and are extended from the outward direction to the downward direction along the outer circumference of the ring-shaped injection pipe; and a second group of injection nozzles which are located at the outer surface of the lower injection pipe, and are extended from the inward direction to the upward direction along the outer circumference of the ring-shaped injection pipe.

2. The bioreactor of claim 1, wherein a heat shield material is attached to the outer surface of the culture drum.

3. The bioreactor of claim 1, wherein the thermostatic controller includes a low temperature heater for effecting a temperature condition needed for culturing by being heated to less than 60° C., and a high temperature heater for disinfecting the culture solution by being heated to more than 60° C.

4. The bioreactor of claim 2, wherein the heat shield material is polyurethane.

5. The bioreactor of claim 1, wherein the controlled circulation pattern includes the rising of the culture solution in the center of the culture drum and lowering of the culture solution near the walls of the culture drum.

* * * * *